United States Patent
Beniakar

(10) Patent No.: US 11,211,860 B2
(45) Date of Patent: Dec. 28, 2021

(54) MODULAR TUBULAR LINEAR SWITCHED RELUCTANCE MACHINE

(71) Applicant: ABB Schweiz AG, Baden (CH)

(72) Inventor: Minos Beniakar, Västerås (SE)

(73) Assignee: ABB Schweiz AG, Baden (CH)

( * ) Notice: Subject to any disclaimer, the term of this patent is extended or adjusted under 35 U.S.C. 154(b) by 559 days.

(21) Appl. No.: 16/064,334

(22) PCT Filed: Jan. 29, 2016

(86) PCT No.: PCT/EP2016/051862
§ 371 (c)(1),
(2) Date: Jun. 20, 2018

(87) PCT Pub. No.: WO2017/129249
PCT Pub. Date: Aug. 3, 2017

(65) Prior Publication Data
US 2019/0006929 A1    Jan. 3, 2019

(51) Int. Cl.
*H02K 41/03*    (2006.01)

(52) U.S. Cl.
CPC ......... *H02K 41/03* (2013.01); *H02K 2207/03* (2013.01); *H02K 2213/03* (2013.01); *H02K 2213/12* (2013.01)

(58) Field of Classification Search
CPC .. H02K 41/03; H02K 41/035; H02K 41/0356; H02K 2207/03; H02K 2213/03; H02K 2213/12

(Continued)

(56) References Cited

U.S. PATENT DOCUMENTS

| | | | |
|---|---|---|---|
| 4,215,283 A | * | 7/1980 | Hinds .............. H02K 41/03 310/14 |
| 4,354,125 A | | 10/1982 | Stoll |

(Continued)

FOREIGN PATENT DOCUMENTS

| | | | | |
|---|---|---|---|---|
| CN | 103560645 | * | 2/2014 | ............. H02K 41/03 |
| DE | 3152717 | * | 2/1983 | ............. H02K 41/03 |

(Continued)

OTHER PUBLICATIONS

Mendes et al., Identification of Some Tubular Topologies of Linear Switched Reluctance Generator for Direct Drive Applications in Ocean Wave Energy Conversion, Jul. 2014, Proceedings of the World Congress on Engineering 2014, vol. I, pp. 398-402 (Year: 2014).*

(Continued)

*Primary Examiner* — Jue Zhang
*Assistant Examiner* — David A. Singh
(74) *Attorney, Agent, or Firm* — Whitmyer IP Group LLC

(57) ABSTRACT

A tubular linear switched reluctance machine includes a segmented translator having a non-magnetic material body and ring segments of magnetic material axially separated from each other and provided on the body. The ring segments are distributed along the axial direction of the body. The machine also includes a stator arranged to electromagnetically interact with the segmented translator, wherein the stator has a plurality of coaxially arranged annular modules, and a respective annular non-magnetic spacer arranged between each pair of subsequently arranged modules.

15 Claims, 2 Drawing Sheets

(58) Field of Classification Search
USPC .................. 310/12.16, 12.18, 23, 34, 35
See application file for complete search history.

(56) References Cited

U.S. PATENT DOCUMENTS

| | | | |
|---|---|---|---|
| 5,081,381 A | 1/1992 | Narasaki | |
| 5,831,353 A * | 11/1998 | Bolding | F04B 47/06 310/12.15 |
| 2011/0298308 A1* | 12/2011 | Aoyama | H02K 41/03 310/12.15 |
| 2012/0025635 A1* | 2/2012 | Iwaki | H02K 33/16 310/14 |
| 2013/0249324 A1* | 9/2013 | Gandhi | H02K 41/033 310/12.18 |

FOREIGN PATENT DOCUMENTS

| | | |
|---|---|---|
| DE | 3152717 T1 | 2/1983 |
| GN | 1463070 A | 12/2003 |
| GN | 103560645 A | 2/2014 |
| GN | 105006947 A | 10/2015 |

OTHER PUBLICATIONS

Chinese Office Action Application No. 2016800792652 Completed: Aug. 14, 2019 5 pages.
Chinese Office Action with Translation Application No. 2016800792652 dated Apr. 2, 2020 11 pages.
Yan Liang et al: "Design and modeling of tubular flux-switching permanent magnet linear motor", Proceedings of 2014 IEEE Chinese Guidance, Navigation and Control Conerence, IEEE, Aug. 8, 2014 (Aug. 8, 2014), pp. 2799-2804.
Menders R.P.G. et al: "Identification of some Tubular Topologies of Linear Switched Reluctance Generator for Direct Drive Applications in Ocean Wave Energy Conversion", XP002763351: Proceedings of the World Congress on Engineering 2014 International Association of Engineers Hong Kong, China Database accession No. 15083747. vol. I, Jul. 4, 2014 (Jul. 4, 2014), pp. 398-402.
International Search Report and Written Opinion of the International Searching Authority Application No. PCT/EP2016/051862 Completed: Oct. 25, 2016; dated Nov. 8, 2016 11 pages.

* cited by examiner

MODULAR TUBULAR LINEAR SWITCHED RELUCTANCE MACHINE

TECHNICAL FIELD

The present disclosure generally relates to electrical machines. In particular it relates to a tubular linear switched reluctance machine which has a modular stator design.

BACKGROUND

The dominant existing linear motor topologies are permanent magnet or induction motors. Switched reluctance linear motors are not widely used, especially of tubular configuration.

Applications in which linear motors are involved require compact, cost-efficient and high performance solutions. Additionally, several applications involve specifications regarding overall weight, reliability and even modularity.

The paper "Identification of some tubular topologies of linear switched reluctance generator for direct drive applications in ocean wave energy conversion", Mendes et al., Proceedings of the World Congress of Engineering 2014 Vol I, WCE 2014, Jul. 2-3, 2014, London, U.K. discloses a number of structural configurations of a linear switched reluctance generator made with tubular topology. One of these geometries, termed "Model C" in the paper includes a stator with ring-shaped elements of ferromagnetic material, in which are located the respective coil phase. The ferromagnetic material is separated by non-magnetic spacers. Each magnetic pole is formed by two teeth with the same dimensions as the ones that compose the salient profile of the secondary, or translator, which is made of a ferromagnetic material. Another one of these geometries, termed "Model D" includes a translator constituted by non-magnetic material with segments of magnetic material.

Although modular, the "Model C" design is rather heavy, which affects the obtainable thrust force of the secondary. The "Model D" design on the other hand is not modular.

SUMMARY

In view of the above, an object of the present disclosure is to provide tubular linear switched reluctance machine which solve or at least mitigate the above-described problems.

There is hence provided a tubular linear switched reluctance machine comprising a translator having a non-magnetic material body and ring segments of magnetic material axially separated from each other and provided on the body, which ring segments are distributed along the axial direction of the body, and a stator arranged to electromagnetically interact with the translator, wherein the stator has a plurality of coaxially arranged annular modules, and a respective annular non-magnetic spacer arranged between each pair of subsequently arranged modules.

The proposed configuration provides a modular tubular motor configuration, with reduced weight and low cost. The mass/weight of the machine is significantly reduced due to the non-magnetic nature of the translator's body while the segmented design of the stator provides modularity. It involves reduced material, construction and maintenance cost and compactness due to the modular nature of the configuration and the absence of any type of excitation in the translator, i.e. windings or magnets.

The present tubular linear switched reluctance machine exhibits high force density and high peak thrust force, which is significantly higher than the respective of the conventional linear switched reluctance motor. Additionally, the modularity of the design offers the capability to create custom solutions based on fundamental unit cell-modules. For example, in theory an infinite number of modules can be added to the stator, if the spacers are replaced with ones of proper width.

According to one embodiment the body is provided with a plurality of axially equally spaced circumferential recesses, wherein each ring segment is arranged in a respective circumferential recess.

According to one embodiment each module has a stator pole pitch width in the axial direction, and the axial distance between the midpoints of any pair of adjacent ring segments defines a translator pole pitch width, wherein the stator pole pitch width differs from the translator pole pitch width.

Through the proper selection of the ratio of the stator pole pitch width to translator pole pitch width, the thrust force waveform can be appropriately controlled in terms of shape, which thereby increases the force density compared to when the stator pole pitch width and the translator pole pitch width are equal.

According to one embodiment each module has two teeth axially separated by a circumferential channel, wherein the stator pole pitch width is defined by the axial distance between the midpoints of each pair of adjacent teeth of a module.

According to one embodiment the stator pole pitch width $\tau_{stator}$ is smaller than the translator pole pitch width $\tau_{translator}$.

According to one embodiment the ratio $k_s$ of the stator pole pitch width and the translator pole pitch width is less than 1.

According to one embodiment a ratio $k_{out}$ between the outer axial length of a ring segment and the translator pole pitch width is less than or equal to 1.

According to one embodiment a ratio $k_{in}$ between the inner axial length of a ring segment and the translator pole pitch width is less than the ratio $k_{out}$.

According to one embodiment the ratio $k_s$ is greater than 0.6.

According to one embodiment the width of each spacer, in the axial direction, is dependent of the number of modules and the ratio $k_s$ of the stator pole pitch width and the translator pole pitch width.

According to one embodiment the width of each spacer is further dependent of the tooth width of the tooth of a module.

According to one embodiment the width of each spacer is determined by the formula $$\left((1-k_s) + \frac{m-1}{m}\right) \cdot \tau_{translator} - b_s$$

where m is the number of modules, $\tau_{translator}$ is the translator pole pitch width, and $b_s$ is the tooth width of the tooth of a module.

According to one embodiment each module comprises a tubular magnetic core and a coil.

According to one embodiment the tubular linear switched reluctance machine is a tubular linear switched reluctance motor.

According to one embodiment the external surface of each ring segment is flush with the external surface of the body.

According to one embodiment the stator is arranged to receive the translator, or the translator is arranged to receive the stator.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclosure relates to a tubular linear switched reluctance machine (TLSRM), i.e. a tubular linear switch reluctance generator or a tubular linear switched reluctance motor, which comprises a translator that includes a non-magnetic material cylinder and a plurality of ring segments made of magnetic material embedded in circumferential recesses provided in the outer periphery of the body. The presence of the ring segments provides the necessary magnetic reluctance variation with respect to the translator's relative position without the need for a salient geometric profile for the translator. The ring segments are distributed along the translator length, each generally having an equal axial extension.

The proposed configuration provides a structure with significantly reduced weight and mass compared to the conventional TLSRM, mainly due to the non-magnetic nature of the material used for the translator body, which enables the provision of a much lighter mover. For the body of the translator any non-magnetic material that is light but mechanically robust to withstand the high thrust force may be used, e.g. plastic or even a foam material can be used, dramatically reducing both the weight and the cost of the machine, due to the really low value of mass density compared to magnetic steel.

The geometry does not comprise a sequence of teeth separated by air parts, but a sequence of magnetic material ring segments that provide the necessary flux paths, embedded in the non-magnetic cylindrical body of the translator.

The TLSRM also comprises a stator having identical phase sets or modules and non-magnetic spacers between each pair of adjacent modules. Each module is magnetically self-contained and comprises a tubular magnetic core. The modules are hence separated by non-magnetic spacers, a feature that incurs complete independency of the respective magnetic paths.

Figure 1:
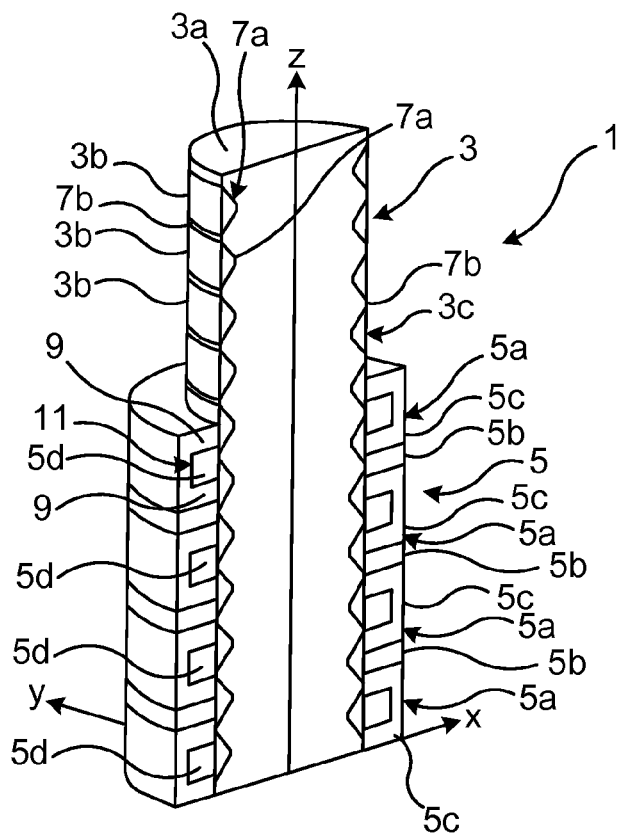
FIG. 1 schematically depicts a longitudinal section of an example of a tubular linear switched reluctance machine.
Figure 2:
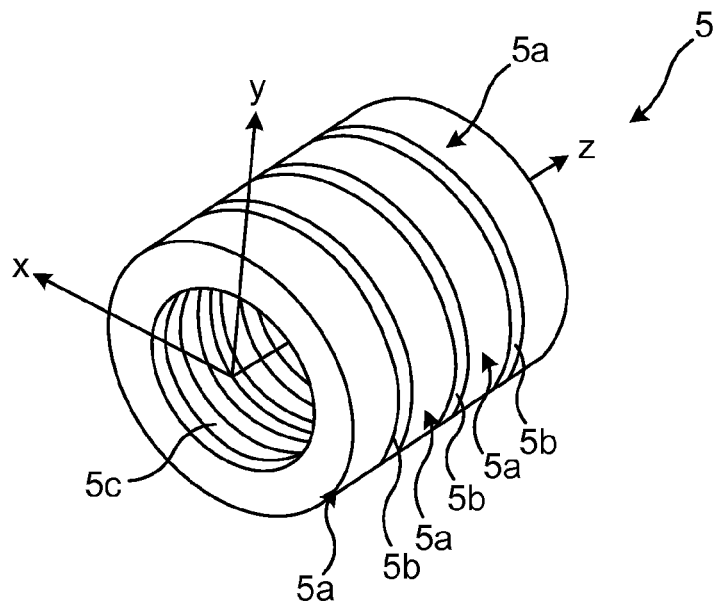
FIG. 2 schematically shows a perspective view of the tubular stator of the tubular linear switched reluctance machine in FIG. 1.
Figure 3:
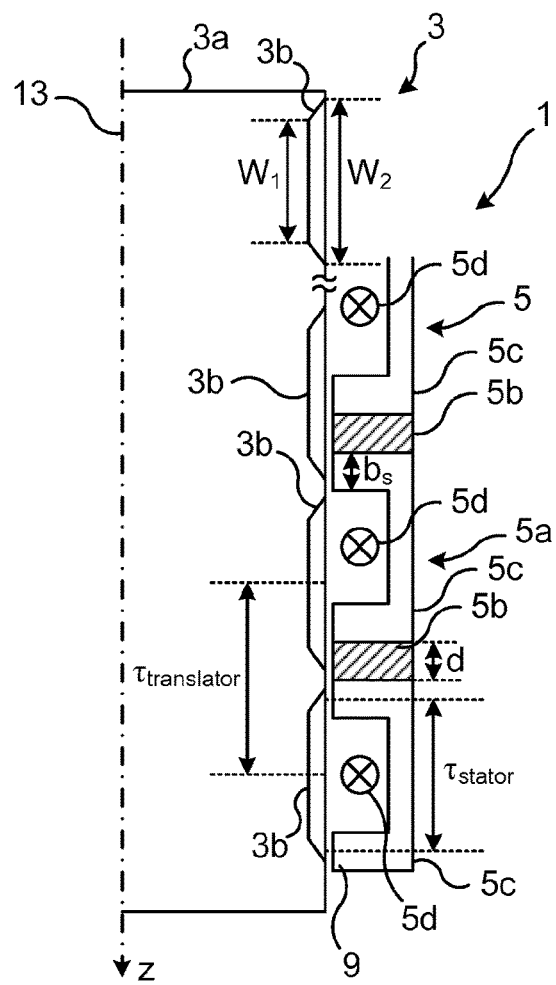
FIG. 3 is a longitudinal section of a tubular linear switched reluctance machine.

With reference to FIGS. 1-3, examples of a tubular linear switched reluctance machine will now be described.

FIG. 1 shows an example of a tubular linear switched reluctance machine, TLSRM, 1 including a translator 3 and a tubular stator 5 arranged to electromagnetically interact with the translator 3. According to the present example, the tubular stator 5 is arranged to receive the translator 3. The translator 3 is arranged to be axially movable relative to the stator 5 when arranged inside the stator 5. In the assembled state of the TLSRM 1, there is an air gap between the stator 5 and the translator 3.

The translator 3 is segmented and cylindrical and comprises a body 3a made of a non-magnetic material and a plurality of axially separated ring segments 3b made of magnetic material. The ring segments 3b are axially separated and distributed coaxially around the body 3a along the axial extension thereof. The ring segments 3b are hence electromagnetically insulated from each other. All the ring segments 3b have the same dimensions.

According to the present example, the body 3a is provided with circumferential recesses 7a, or circumferential grooves, extending along the entire circumference of the body 3a and distributed along the longitudinal extension of the body 3a. Between each circumferential recess 7a the body 3a has a circumferential external surface 7b which distances adjacent circumferential recesses 7a. Adjacent ring segments 3b are thereby physically separated from each other thereby providing an electromagnetic insulation between adjacent ring segments 3b. The circumferential recesses 7a are parallel and coaxial around the central axis z of the TLSRM 1. Each ring segment 3b is arranged in a respective circumferential recess 7a. The external surface 3c of each ring segment 3b is arranged flush with the external surface 7b of the body 3a. In this manner the translator 3 obtains its cylindrical non-salient shape.

The tubular stator 5 comprises a plurality of coaxially arranged annular modules, or stator modules, 5a and spacers 5b, as shown in FIGS. 1 and 2. Each spacer 5b is annular and arranged between respective two adjacent modules 5a. Modules 5a and spacers 5b are hence arranged in an alternating manner. Each module 5a comprises a tubular magnetic core 5c. Each spacer 5b is made of a non-magnetic material. The modules 5a are equally spaced apart, i.e. all spacers 5b have the same axial width.

In a typical variation, the number of ring segments 3b is not an integer multiple of the number of modules 5a.

Each module 5a furthermore has two teeth 9 axially whereby an inner circumferential channel 11, or back iron, is formed therebetween. In cross-section, each module hence has a C-type shape. Each module 5a furthermore comprises a respective coil 5d arranged in the space between the two teeth 9, i.e. in the circumferential channel 11. Each module 5a may for example comprise a C-type tubular magnetic core and a spool-type or disk-type coil. Alternatively, the magnetic circuit of each module can be formed of two disks and one ring instead of a C-type tubular magnetic core.

According to one variation, every pair of module 5a and coil 5d defines a distinct electric phase.

The tubular stator 5 is modular in the sense that during manufacturing its length is determined by the number of modules and spacers that are necessary for a particular application. To increase the force density in case the TLSRM 1 is a tubular linear switch reluctance motor the addition of stator modules can be employed.

The length of the translator 3 is defined by the specification of the mechanical stroke length.

Independence of magnetic circuits and modularity are the most prominent advantages that the stator configuration offers. In that sense, theoretically an infinite number of independent modules can be added in the stator, and provided that the width of the non-magnetic separators is appropriately adjusted, to produce force waveforms with minimum ripple.

Turning now to FIG. 3 a longitudinal section of one half along a symmetry line 13 of a variation of TLSRM 1 is shown. In order to obtain higher and a more symmetric thrust force upon operation of the TLSRM 1, the stator pole pitch width $\tau_{stator}$ of the stator 5 is designed to differ from the translator pole pitch width $\tau_{translator}$ of the translator 3.

The stator pole pitch width $\tau_{stator}$ is defined in the longitudinal direction of the TLSRM 1, i.e. in the axial direction z. The translator pole pitch width $\tau_{translator}$ is also defined in the longitudinal direction of the TLSRM 1, i.e. in the axial direction z. In particular, the stator pole pitch width $\tau_{stator}$ is defined by the axial distance between the centres, i.e. midpoints, of the two teeth 9 of a module 5a. The translator pole pitch width $\tau_{translator}$ is defined by the axial distance between the centres, i.e. midpoints, of two adjacent or consecutive ring segments 3b, in particular along the external surface of the translator 3.

Preferably, the stator pole pitch width $\tau_{stator}$ is less than the translator pole pitch width $\tau_{translator}$. This ensures a higher thrust force and a more symmetric thrust force waveform compared to the situation where the tubular stator 5 and the translator have identical pole pitch widths. The ratio $k_s = \tau_{stator}/\tau_{translator}$ of the stator pole pitch width and the translator pole pitch width should hence preferably be less than 1. In general, the exact size of the ratio is dependent of the rating and size of the TLSRM 1. For certain designs it has been found by the present inventors that the highest thrust force peak and most symmetric thrust force waveform can be obtained when the ratio $k_s$ is below 0.9. It may be particularly advantageous if the ratio $k_s$ is less than 0.9, even more preferably less than 0.85, for example 0.8 or 0.78. The ratio $k_s$ may according to one variation be at least 0.6, for example greater than 0.6, such as 0.65. The axial width d, of the spacers 5b is determined by the number of utilized modules 5a and the value of the ratio $k_s$, and is electromagnetically equivalent to a cycle of the phase inductance variation divided by the number of modules. The introduction of the modules 5a decreases the length of the flux paths and can produce high aligned inductance. The inductance is also practically independent of the current value in the fully unaligned position, where the minimum inductance occurs. Additionally, in the fully aligned position, where the maximum inductance occurs, the inductance is strongly affected by the magnitude of the exciting phase current. The maximum thrust force is produced when a stator tooth just starts to overlap with a ring segment 3b of the translator 3. This overlap provides a really narrow flux path between the teeth 9 of the module 5a and the ring segment that causes the production of a high positive force value, as the stator 5 attracts the translation towards the direction that the translator 3 is moving.

For a given number m of modules 5a the axial width d of the spacers 5b is determined based on the value of the ratio $k_s$. In general, while designing the TLSRM 1 the width d of the spacers 5b is determined based on the value of the ratio $k_s$ and on the number m of modules 5a. The width d of the spacers 5b is furthermore dependent of the tooth width $b_s$, i.e. the axial length of a tooth 9. The analytical formula for determining the axial width d of the spacers 5b given the ratio $k_s$ is determined by the following equation.

$$\left((1-k_s) + \frac{m-1}{m}\right) \cdot \tau_{translator} - b_s \quad (1)$$

where $\tau_{translator}$ is the translator pole pitch, which is defined by the distance from a first axial end of a ring segment 3b to the corresponding first axial end of an adjacent ring segment 3b or equivalently, as previously mentioned, the axial distance between the centre of two adjacent or consecutive ring segments 3b.

Further parameters that influence the thrust force is the ratio $k_{out}$ between the outer axial length W2 of a ring segment 3b and the translator pole pitch width $\tau_{translator}$, and the ratio $k_{in}$ between the inner axial length W1 of a ring segment 3b and the translator pole pitch width $\tau_{translator}$. According to one variation, the ratio $k_{out}$ between the outer axial length W2 of a ring segment 3b and the translator pole pitch width $\tau_{translator}$ is less than or equal to 1, i.e.

$$k_{out} = \frac{W_2}{\tau_{translator}} \leq 1 \quad (2)$$

Moreover, according to one variation the ratio $k_{in}$ between the inner axial length W1 of a ring segment 3b and the translator pole pitch width $\tau_{translator}$ is less than the ratio $k_{out}$, i.e.

$$k_{in} = \frac{W_1}{\tau_{translator}} \leq k_{out} \quad (3)$$

The longitudinal sectional shape of each ring segment 3b is therefore preferably designed such that the outer axial length W2 is longer than the inner axial length W1 of a ring segment 3b. The ring segments 3b may for example have trapezoidal shaped longitudinal section, as shown in e.g. FIGS. 1 and 3. Other longitudinal sectional shapes of the ring segments are however also envisaged, for example cyclic quadrilateral shapes or elliptic shape.

The parameters $k_{out}$ and $k_{in}$ provide additional benefit to the designer of the TLSRM since the designer can work with per unit values. The two lengths W2 and W1 affect the performance of a motor. Defining them as ratios gives additional degrees of freedom in design.

Figure 4:
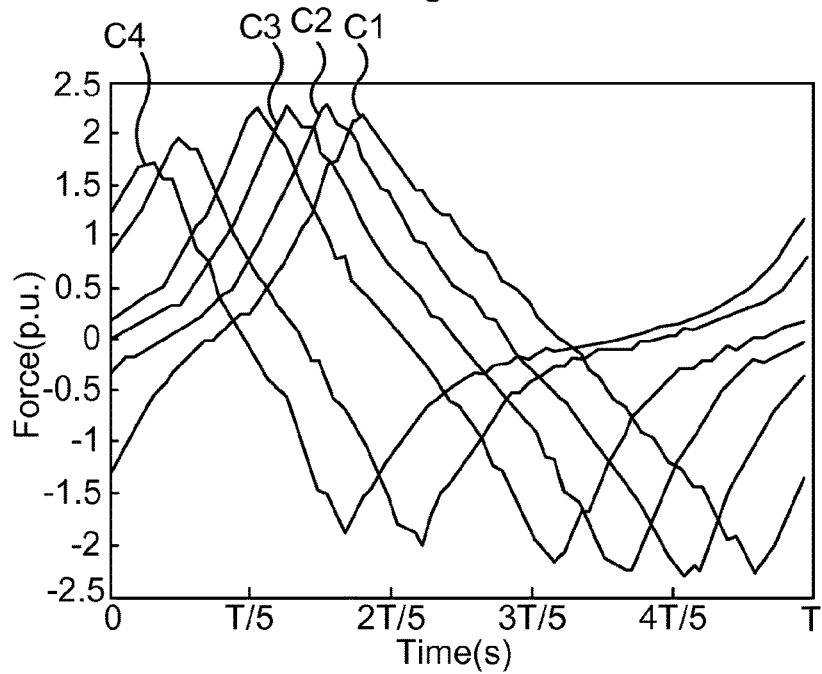
FIG. 4 shows thrust force waveforms for different ratios $k_s$ of the stator pole pitch width and the translator pole pitch width, when only one phase is excited.

Turning now to FIG. 4, thrust force waveforms for different ratios $k_s$ of the stator pole pitch width and the translator pole pitch width, when only one phase is excited is shown. The waveforms of these curves show overload operation that corresponds to force higher than double the nominal force. The curves C1, C2 and C3 show the thrust force when the pole pitch widths of the stator and translator are selected such that $k_s$ is 0.7, 0.75 and 0.8, respectively, plotted against time corresponding to a translation equal to one translator pole pitch width. The peak value of the thrust force in each curve is obtained when a ring segment starts to overlap with a tooth. When there is a complete alignment, the force is zero. Curve C4 shows the thrust force when the ratio $k_s$ is equal to 1. It may be understood from these waveforms that the most symmetric thrust force curve and highest peak thrust force can be obtained when the ratio $k_s$ is selected to be somewhere between 0.7 and 0.8.

The inventive concept has mainly been described above with reference to a few examples. However, as is readily appreciated by a person skilled in the art, other embodiments than the ones disclosed above are equally possible within the scope of the inventive concept, as defined by the appended claims. Instead of the internal translator configuration described above, an external translator configuration is also possible, i.e. the translator could be tubular and arranged to receive the tubular stator. In this case, the ring segments would be arranged in circumferential recesses on the inner surface, i.e. along the inner circumference, of the tubular translator.

The invention claimed is:

1. A tubular linear switched reluctance machine comprising:
    a translator having a non-magnetic material body and ring segments of magnetic material axially separated from each other and provided on the body, the ring segments are distributed along an axial direction of the body, and
    a stator arranged to electromagnetically interact with the translator, wherein the stator has a plurality of coaxially arranged annular modules, and a respective annular non-magnetic spacer arranged between each pair of subsequently arranged modules,
    wherein each module has a stator pole pitch width in the axial direction, and an axial distance between midpoints of any pair of adjacent ring segments defines a translator pole pitch width, wherein the stator pole pitch width differs from the translator pole pitch width,
    wherein each module has two teeth axially separated by a circumferential channel, wherein the stator pole pitch width is defined by an axial distance between midpoints of each pair of adjacent teeth of the respective module, and
    wherein the stator pole pitch width is smaller than the translator pole pitch width.

2. The tubular linear switched reluctance machine as claimed in claim 1, wherein the body is provided with a plurality of axially equally spaced circumferential recesses, wherein each ring segment is arranged in a respective circumferential recess.

3. The tubular linear switched reluctance machine as claimed in claim 2, wherein an external surface of each ring segment is flush with an external surface of the body.

4. The tubular linear switched reluctance machine as claimed in claim 2, wherein each module has a stator pole pitch width in the axial direction, and axial distance between midpoints of any pair of adjacent ring segments defines a translator pole pitch width, wherein the stator pole pitch width differs from the translator pole pitch width.

5. The tubular linear switched reluctance machine as claimed in claim 1, wherein a ratio $k_s$ of the stator pole pitch width and the translator pole pitch width is less than 1.

6. The tubular linear switched reluctance machine as claimed in claim 1, wherein a ratio $k_{out}$ between an outer axial length of one of the ring segments and the translator pole pitch width is less than or equal to 1.

7. The tubular linear switched reluctance machine as claimed in claim 6, wherein a ratio $k_{in}$ between an inner axial length of one of the ring segments and the translator pole pitch width is less than the ratio $k_{out}$.

8. The tubular linear switched reluctance machine as claimed in claim 1, wherein a width of each spacer, in the axial direction, is dependent of the number of modules and a ratio $k_s$ of the stator pole pitch width and the translator pole pitch width.

9. The tubular linear switched reluctance machine as claimed in claim 8, wherein the width of each spacer is further dependent of a tooth width of one of the teeth of the respective module.

10. The tubular linear switched reluctance machine as claimed in claim 8, wherein the width of each spacer is determined by the formula $$\left((1-k_s)+\frac{m-1}{m}\right)\cdot\tau_{translator}-b_s$$

where m is the number of modules, $\tau_{translator}$ is the translator pole pitch width, and $b_s$ is a tooth width of one the teeth of the respective module.

11. The tubular linear switched reluctance machine as claimed in claim 9, wherein the width of each spacer is determined by the formula $$\left((1-k_s)+\frac{m-1}{m}\right)\cdot\tau_{translator}-b_s$$

where m is the number of modules, $\tau_{translator}$ is the translator pole pitch width, and $b_s$ is the tooth width of said one of the teeth of the respective module.

12. The tubular linear switched reluctance machine as claimed in claim 1, wherein each module includes a tubular magnetic core and a coil.

13. The tubular linear switched reluctance machine as claimed in claim 1, wherein the tubular linear switched reluctance machine is a tubular linear switched reluctance motor.

14. The tubular linear switched reluctance machine as claimed in claim 1, wherein the stator is arranged to receive the translator or the translator is arranged to receive the stator.

15. A tubular linear switched reluctance machine comprising:
    a translator having a non-magnetic material body and ring segments of magnetic material axially separated from each other and provided on the body, the ring segments are distributed along an axial direction of the body, and
    a stator arranged to electromagnetically interact with the translator, wherein the stator has a plurality of coaxially arranged annular modules and a plurality of annular non-magnetic spacers, wherein each pair of subsequently arranged module is separated by one of the annular non-magnetic spacers,
    wherein each module has a stator pole pitch width in the axial direction, and an axial distance between midpoints of any pair of adjacent ring segments defines a translator pole pitch width, wherein the stator pole pitch width differs from the translator pole pitch width,
    wherein each module has two teeth axially separated by a circumferential channel, wherein the stator pole pitch width is defined by an axial distance between midpoints of each pair of adjacent teeth of the respective module, and
    wherein the stator pole pitch width is smaller than the translator pole pitch width.

\* \* \* \* \*